Nov. 21, 1950   J. A. PILGRIM   2,530,399
STUMP ELIMINATOR
Filed June 24, 1949   2 Sheets-Sheet 1
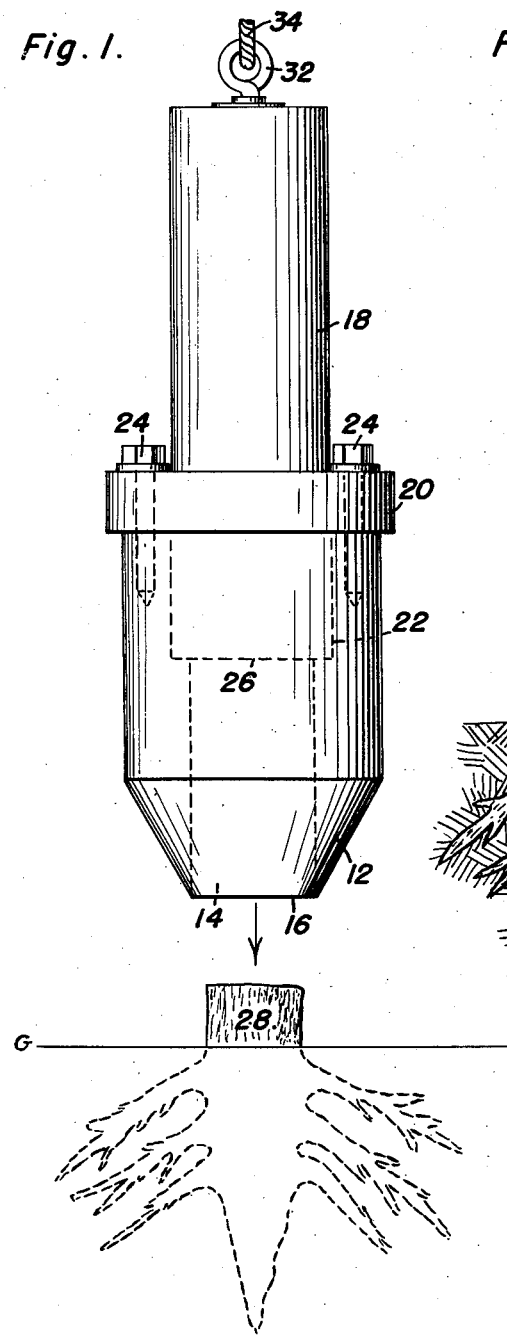
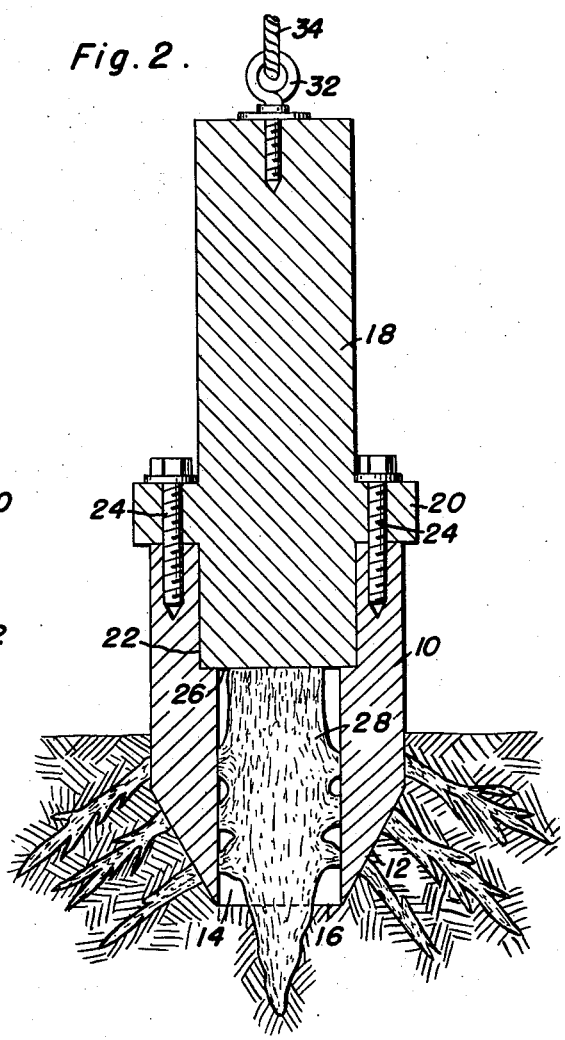
Inventor
Joseph A. Pilgrim
By *Clarence A. O'Brien and Harvey B. Jacobson*
Attorneys Nov. 21, 1950 J. A. PILGRIM 2,530,399
STUMP ELIMINATOR
Filed June 24, 1949 2 Sheets-Sheet 2
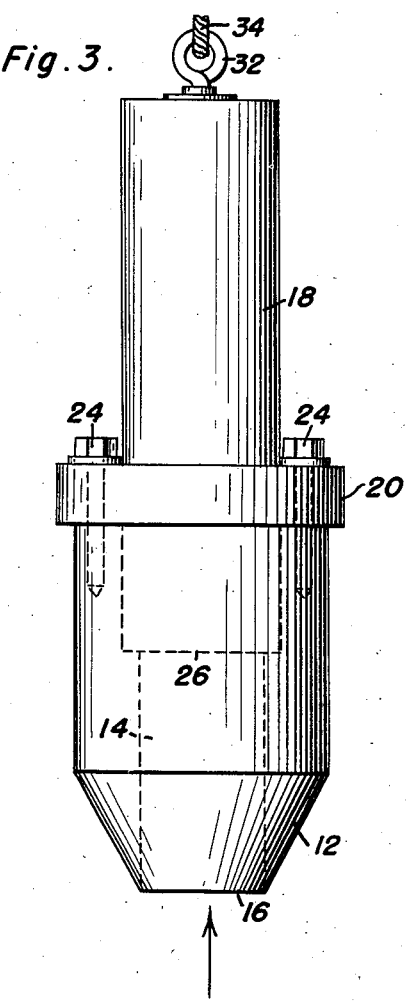
Fig. 3.
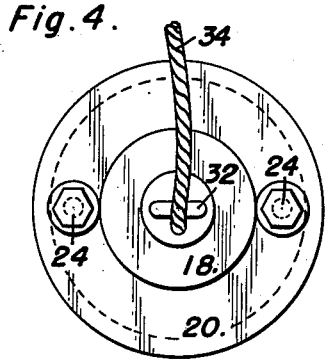
Fig. 4.
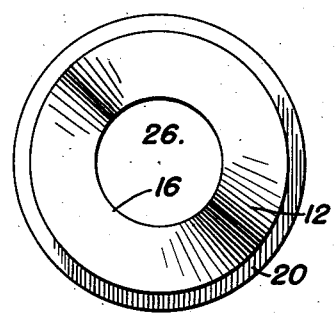
Fig. 5.
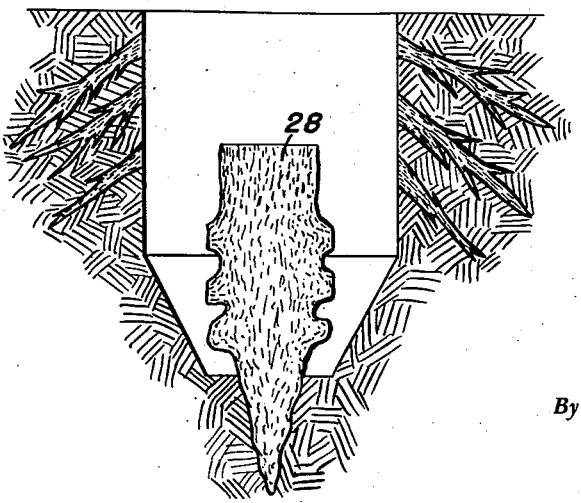
Inventor
Joseph A. Pilgrim
By *Clarence A. O'Brien and Harvey B. Jacobson*
Attorneys Patented Nov. 21, 1950

2,530,399

UNITED STATES PATENT OFFICE 2,530,399

STUMP ELIMINATOR

Joseph A. Pilgrim, Elberta, Ala.

Application June 24, 1949, Serial No. 101,138

5 Claims. (Cl. 37—2)

This invention relates to novel and useful improvements in devices and apparatus for clearing stumps from a field or from an area which has had the tops and the major part of the tree removed.

An object of this invention is to cleave the roots of a stump from the center section or part of the stump by means of passing a cutter downwardly over the center section of the stump so that the stump is in substantially concentric relationship with the cutter and shortly after the roots have been cut, strike the top part of the center longitudinal section of the stump so that it will urge the center section at least partially into the ground to drive it below the grade line or surface of the terrain.

Another object of this invention is to drive a stump into the ground by cutting the roots from the stump and striking the center section of the stump in a single cycle of operation of a mechanism which includes a hammer and a sleeve type cutter with the sharp edge at one end of the sleeve and the hammer disposed at the other end of the sleeve and within the bore thereof so that in order to perform the stump removing operation, it is only necessary to forcibly press the sleeve around the center part of the stump, thereby cutting certain of the roots from the center section, and upon urging the sleeve downwardly further, the hammer engaging the top part of the center section drives it into the ground.

Another object of this invention is to obviate, in the large part, the necessity of blasting or removing stumps in other now conventional manners.

Ancillary objects and features of novelty will become apparent to those skilled in the art, in following the description of the preferred form of the invention, illustrated in the accompanying drawings, wherein:

Figure 1 is an elevational view showing the first step in the operation of the stump clearing;

Figure 2 is a sectional view of the device shown in Figure 1 showing it at the time that it has cut the roots from the stump and at the time that the hammer has engaged the center section of the stump;

Figure 3 is a schematic view showing the device in elevation and illustrative of the final step in the operation, that is, after the stump has had its roots cleft therefrom and after the center section of the stump has been driven in the ground and after the device has been removed from the hole which was made in the ground during this process;

Figure 4 is a plan view of the device shown in Figure 1; and

Figure 5 is a bottom view of the device shown in Figure 1.

It is now conventional to remove very large stumps by blasting. Smaller stumps can be removed by the use of a bulldozer and appropriate attachments. In the absence of these methods of removal of stumps, they have to be taken from the ground by various non-conventional stump pullers or pried from the ground by the assistance of levers. To my knowledge, it is basically new to clear a field by driving the stumps into the ground through the utility of special mechanism capable of cutting certain of the roots from the stump and driving the center section of the stump, after the roots have been cut, into the ground.

To perform this function, a sleeve-type cutting member 10 is used which has the exterior surface thereof tapered as at 12 so that the interior surface defining the bore 14 of the cutting member terminates in a cutting edge 16.

A hammer which, in this instance, is in the shape of a rod or shank 18 with an annular collar 20 thereon is supplied. This annular collar rests on the top of the sleeve 10 and the portion of the shank 18 below the collar 20 is disposed in a counterbore 22 of the bore 14. By having screws 24 passed through suitable openings in the collar 20 and terminating in threaded apertures in the sleeve 10 longitudinally thereof, the shank 18 is held fixed with respect to the cutting member 10. The surface 26 which is disposed within the bore 14 of the member 10 acts as a hammering surface or a hammer to operatively engage the top part of the center section 28 of the stump.

In operation, the device is disposed above the center section 28 of a stump, as disclosed in Figure 1. Then it is lowered so that the cutting edge 16 cleaves the roots of the stump from the center section 28 (Figure 2). By operating the device downwardly even further, the hammer 26 engages the top longitudinal center part 28 of the stump, thereby pushing it further into the ground. In fact, it pushes it so far into the ground that it is below the grade line or surface of the surrounding terrain (Figure 3). Thereafter, the device is simply lifted from the hole made in the ground by this operation, which hole may be filled by any suitable operation.

There are many ways in which the device may be rendered operative. For illustrative purposes only, the applicant has illustrated an eye 32 which is disposed at the top part of the shank 18 with a cable 34 therein. Under these conditions, the device is made of sufficient weight so that by having it poised above the stump and allowing it to drop, the pull of gravity causes the actual cutting and hammering operations. In this mode of operation, it may require two or more successive operations to completely drive the center section 28 of the stump below grade. The device, on the other hand, may be made as heavy as practically or reasonably possible.

If desired, an apparatus for imparting reciprocatory movement to the entire device so that a selected amount of force may be exerted on the stumps, may be used.

Also in operation of the device, a conventional air hammer may be employed. First, the roots which project laterally of the center section of the stump may be cleft by gravity lowering the device. Then, the conventional air hammer may be attached to the device and used to drive the center section of the stump below the ground level to thereby complete the root cutting operation.

Having described the invention, what is claimed as new is:

1. A device for clearing stumps comprising a substantially cylindrical member having a cutter at one end for cleaving roots of a tree stump while it is in the ground and as the longitudinal part thereof passes into the bore of the member, and a hammer disposed in the bore of the sleeve for striking the top of the longitudinal part of the stump to force it into the ground in the same operation that the roots are cleft.

2. A device for clearing stumps comprising a substantially cylindrical member having a cutter at one end for cleaving roots of a tree stump while it is in the ground and as the longitudinal part thereof passes into the bore of the member, a hammer disposed in the bore of the sleeve for striking the top of the longitudinal part of the stump to force it into the ground in the same operation that the roots are cleft, and means fixed to said hammer and said member for releasably securing said hammer to said member.

3. A stump clearing device adapted to be reciprocated in the operation thereof comprising a cutting member having a cutting edge at one end thereof adapted to cut the roots from the center part of the stump while the roots are in the ground when said member is operated downwardly, and a hammer fixed to said member but spaced from the cutting edge so that the center section of the stump is struck by the hammer after some of the stump roots are cut in order to drive the center section of the stump into the ground.

4. In a stump clearing device, a cutting member for cutting the roots of the stump, and means secured to said member for driving the center part of the stump at least partially into the ground below the grade line.

5. In a stump clearing device, a cutting member for cutting the roots of the stump, and means secured to said member for driving the center part of the stump at least partially into the ground below the grade line after some of the stump roots are cut and during a single cycle of operation of the cutting member.

JOSEPH A. PILGRIM.

No references cited.